United States Patent
Bhachech et al.

(10) Patent No.: US 8,705,115 B1
(45) Date of Patent: Apr. 22, 2014

(54) GENERATION OF INVERSE TRANSFER FUNCTION FOR IMAGE RENDERING DEVICE

(75) Inventors: Miheer M. Bhachech, Mountain View, CA (US); Jeffrey M. DiCarlo, Menlo Park, CA (US); Mark Q. Shaw, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2538 days.

(21) Appl. No.: 11/411,451

(22) Filed: Apr. 26, 2006

(51) Int. Cl.
*H04N 1/60* (2006.01)
*G06K 1/00* (2006.01)

(52) U.S. Cl.
USPC ............ 358/1.9; 358/504; 358/518; 358/525; 358/530; 382/167; 382/162

(58) Field of Classification Search
USPC .......................... 358/1.9, 504, 518, 525, 530
See application file for complete search history.

(56) References Cited

U.S. PATENT DOCUMENTS

| | | | | |
|---|---|---|---|---|
| 5,296,923 A | * | 3/1994 | Hung | 358/527 |
| 5,721,572 A | * | 2/1998 | Wan et al. | 345/590 |
| 6,185,004 B1 | * | 2/2001 | Lin et al. | 358/1.9 |
| 6,262,744 B1 | * | 7/2001 | Carrein | 345/604 |

OTHER PUBLICATIONS

U.S. Appl. No. 11/254,378, filed Oct. 25, 2005 and entitled "Gamut Boundary Mapping".

* cited by examiner

*Primary Examiner* — Quang N Vo

(57) ABSTRACT

An inverse transfer function is computed from a forward transfer function of an image rendering device. During the computation, device-dependent values are extrapolated for border nodes. The extrapolated values are out-of-gamut.

20 Claims, 10 Drawing Sheets

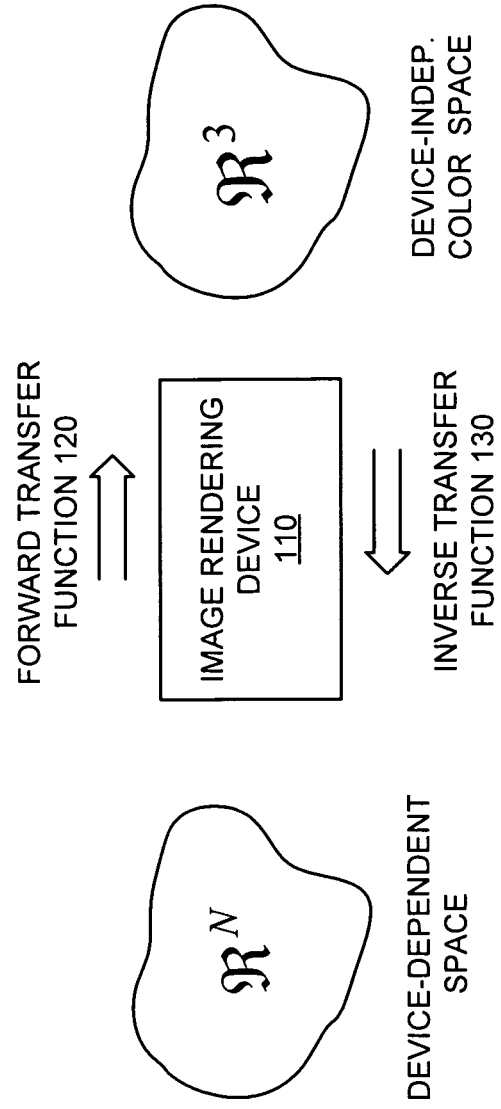

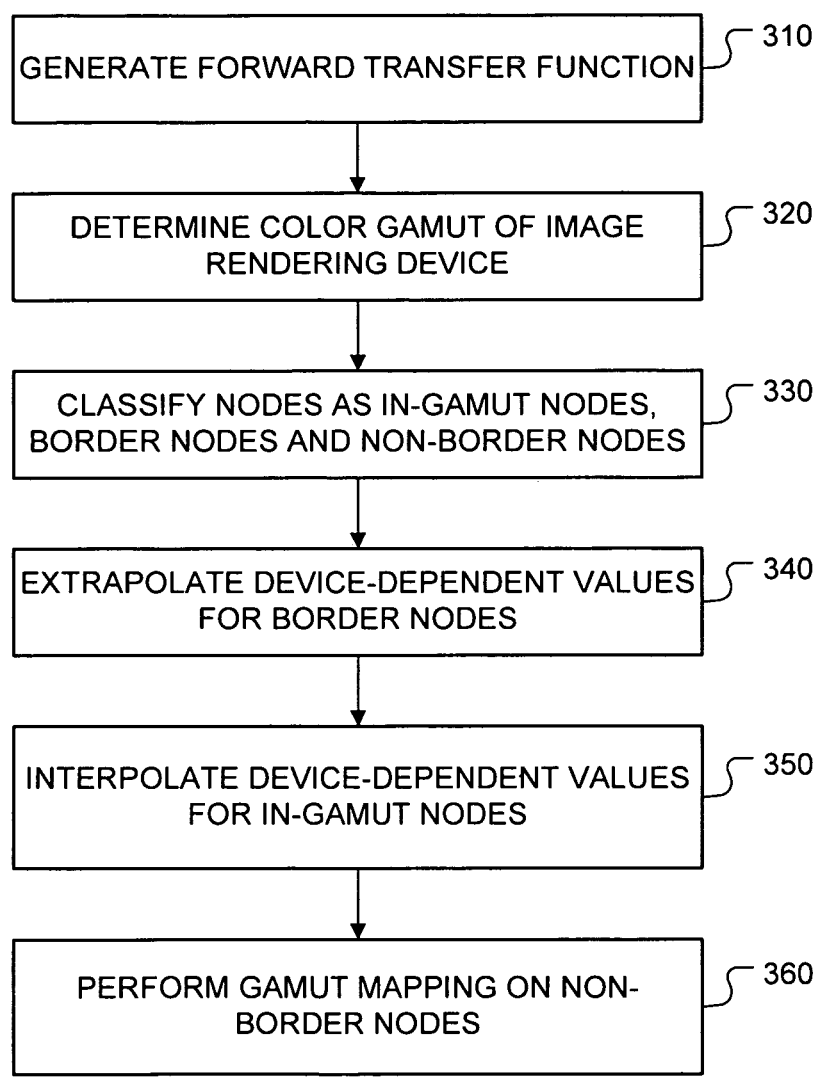

GENERATION OF INVERSE TRANSFER FUNCTION FOR IMAGE RENDERING DEVICE

BACKGROUND

Certain printers and other image rendering devices receive images described for a device-independent color space, convert the images to a device-dependent color space, and then render the converted images. A device-independent color space describes color as perceived by the human visual system. Examples of device-independent color space include, without limitation, CIE Lab and tristimulus XYZ.

A device-dependent color space describes color as a function of the primary colorants available to a specific image rendering device. Consider a four-colorant printer that prints with cyan (C), magenta (M), yellow (Y), and black (k) inks. Device-independent images are converted to CMYK space, and the converted images are rendered with cyan, magenta, yellow and black inks.

An image rendering device may use an inverse transfer function to determine the relative quantities of primary colorants needed to obtain a desired color in device-independent color space. For example, the inverse transfer function of a four-colorant printer might specify the relative amounts of cyan, magenta, yellow and black colorants needed to produce an Lab color.

The inverse transfer function of an image rendering device can be obtained during product development. A forward transfer function of the device may be obtained by using the device to render a grid of colors, and then mapping the colors in the grid to the colors in device-independent color space. The forward transfer function may then be inverted to produce the inverse transfer function.

Inaccurate inversion can cause color errors and artifacts in images rendered by an image rendering device. The artifacts can degrade image quality. For example, inaccurate inversion for a printer can result in color artifacts and contouring in prints.

It would be desirable to improve the accuracy of the inversion.

BRIEF DESCRIPTION OF THE DRAWINGS

FIG. 1 is an illustration of an image rendering device with respect to device-dependent and device-independent color spaces.

FIGS. 3a-3c are illustrations of a method of generating an inverse transfer function in accordance with an embodiment of the present invention.

DETAILED DESCRIPTION

Figure 2A:
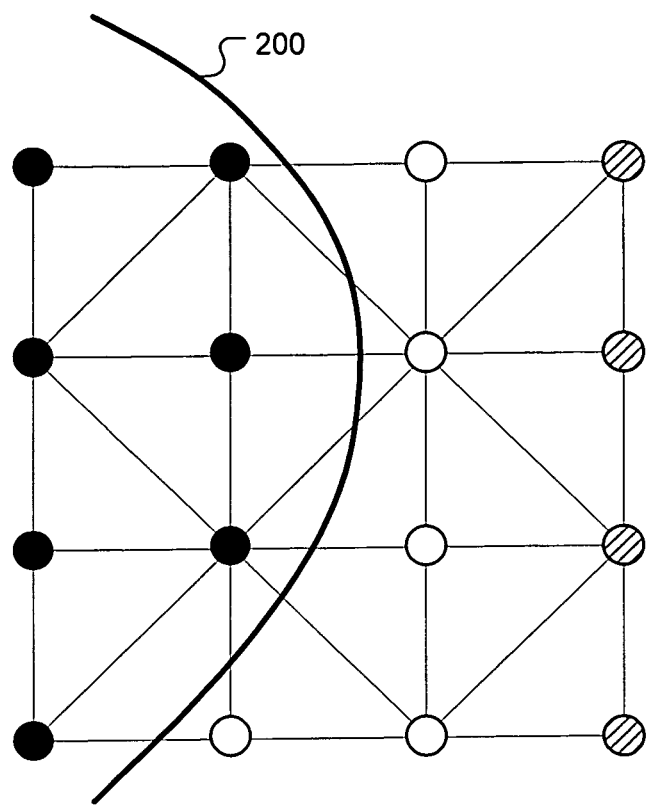
FIG. 2a is an illustration of an exemplary inverse transfer function of the image rendering device.

As shown in the drawings for purposes of illustration, the present invention is embodied in the generation of inverse transfer functions for image rendering devices. Inverse transfer functions may be generated for image rendering devices such as printers and display devices (e.g., digital projectors, devices with LCD screens and other flat panel screens, CRTs, digital light projectors). These image rendering devices may use the inverse transfer functions to convert images from device-independent color space to device-dependent color space.

Reference is made to FIG. 1, which illustrates an image rendering device 110 having N primary colorants. The N primary colorants define a device-dependent space, which is denoted by $\Re^N$. As a first example, the primary colorants cyan, magenta, yellow and black would define a device-dependent space $\Re^N$ for a printer that prints with cyan, magenta, yellow and black inks. As a second example, the primary colorants red, green and blue would define a device-dependent space $\Re^N$ for an RGB video monitor.

A forward transfer function 120 maps device-dependent space of the image rendering device into a device-independent color space. The forward transfer function 120 determines the color in device-independent color space that will result from a specified combination of primary colorants. The device-independent color space, which typically has three components, is denoted by $\Re^3$. The mapping of device-dependent space into device-independent color space onto is denoted as $\Re^N \Rightarrow \Re^3$.

An inverse transfer function 130 of the device 110 determines relative quantities of primary colorants needed to obtain a desired color in device-independent color space. That is, the inverse transfer function 130 maps device-independent color space ($\Re^3$) into device-dependent space ($\Re^N$), or $\Re^3 \Rightarrow \Re^N$. The inverse transfer function may be determined by inverting the forward transfer function 120.

FIG. 2a illustrates a grid of nodes that represent an inverse transfer function of the image rendering device 110 (in practice, the grid will be much larger). The nodes are in a device-independent space. A curve 200 represents the color gamut of the image rendering device 110. Those nodes within the device gamut (illustrated as the black circles lying to the left of the curve 200) are referred to as "in-gamut nodes." Those nodes lying outside the device gamut (illustrated as the circles lying to the right of the curve 200) are referred to as "out-of-gamut nodes." Out-of-gamut nodes that influence the interpolation of in-gamut colors are referred to as "border nodes." The border nodes are illustrated as white circles, and the remaining out-of-gamut nodes (referred to as "non-border" nodes) are illustrated as cross-hatched circles.

Figure 2B:
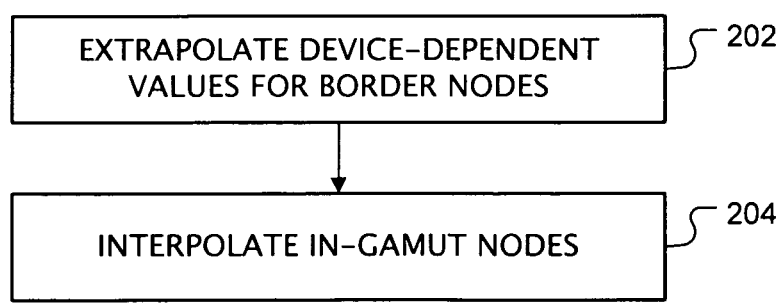
FIG. 2b is an illustration of a general method of generating an inverse transfer function in accordance with an embodiment of the present invention.

FIG. 2b illustrates certain steps for generating an inverse transfer function from a forward transfer function of the image rendering device 110. At block 202, device-dependent values for border nodes are extrapolated. The extrapolated values are themselves out of gamut. At block 204, in-gamut nodes are interpolated. Border nodes are used to interpolate some of the in-gamut nodes.

Reference is made to FIG. 3a, which illustrates an exemplary method of generating an inverse transfer function for the image rendering device 110. At block 310, a forward transfer function is generated for the device 110. The forward transfer function may be generated as a table. The forward table includes a plurality of entries. Each entry is indexed by a combination of primary colorants. The value of each entry is the device-independent value that corresponds to the combination.

The forward table may be populated with device-independent values as follows. The image rendering device 110 is used to render different combinations of primary colorants. Spectra of each rendered combination is measured and converted to device-independent color space. In the case of a printer, the samples may be printed on one or more sheets of paper, and the spectra may be measured (in a device-independent color space) with a spectrophotometer, which indicates the amount of light reflected for different wavelengths. The measured spectra provide physical color information for the different combinations of inks. Thus, a color combination is rendered and its spectra measured, an entry in the forward table is indexed according to the combination, and the measured spectra value is stored at the indexed entry.

Figure 3B:
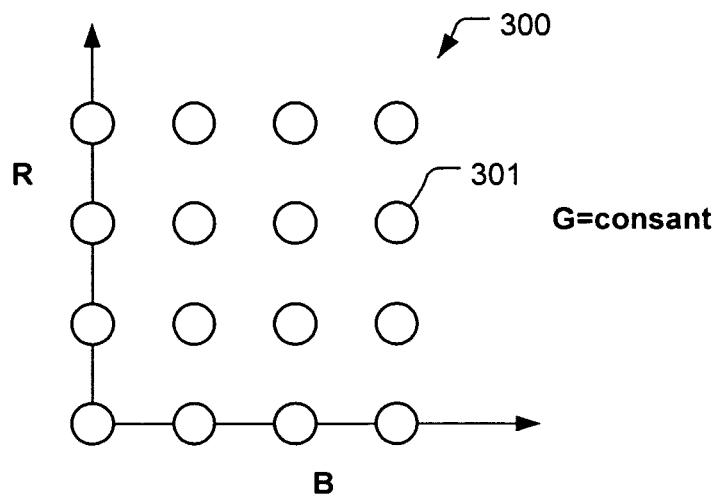

Reference is made to FIG. 3b, which illustrates a level 300 of an exemplary forward table for an RGB device. The position of each entry 301 is determined by an "R" value, a "G" value, and a "B" value. Each entry 301 corresponds to relative amounts of red, green and blue colorants, and each entry stores a measured device-independent value.

One axis indicates the value of red colorant (R) and another axis indicates the value of blue colorant (B). Values for green (G) are the same for all of the entries in the illustrated level. Spacing of the entries may be uniform.

Referring once again to FIG. 3a, an inverse transfer function is generated from the forward transfer function. The inverse transfer function may be generated as a table. The inverse table includes a plurality of nodes. Each node is indexed by a value in device-independent space. Consider the example in which Lab is the device-independent color space. Each node is indexed by an "L" value, an "a" value, and a "b" value. Thus, the inverse table is three-dimensional.

The nodes in the inverse table may be uniformly spaced apart. For instance, the "L" values may increase from 0 to 100 at a constant step size, the "a" values may increase from −128 to 128 at a constant step size, and the "b" values may increase from −128 to 128 at a constant size. However, the inverse table is not limited to uniform spacing. The values may increase by step sizes that are non-linear.

During inversion, the inverse table is populated with device-dependent values. During the inversion, steps are taken to increase utilization of the device gamut and reduce errors introduced at gamut borders. Increasing the gamut utilization allows the image rendering device to render colors that are more saturated. Reducing these errors can reduce artifacts in rendered images. Consequently, image quality will be improved in images rendered by the image rendering device 110.

The inverse table may be populated as follows. At block 320, the color gamut of the image rendering device 110 is determined. The color gamut encompasses in-gamut nodes (that is, those nodes whose device-independent values can be reproduced by the image rendering device 110). The remaining nodes are out-of-gamut (that is, the nodes whose colors cannot be reproduced by the image rendering device 110). For example, the color gamut may be computed by using a 3D convex hull algorithm to find the 3D convex hull of the measured samples in the forward table. The hull gives the totality of the all the colors that the device 110 can render.

At block 330, each node is classified as an in-gamut node, a border node, or a non-border node. In-gamut nodes may be classified as those nodes inside the device gamut. Border nodes may be identified by testing each node outside the device gamut to see if it is adjacent to an in-gamut node. If the out-of-gamut node is adjacent to an in-gamut node, the out-of-gamut node is classified as a border node. Otherwise, the out-of-gamut node is classified as a non-border node.

Figure 3C:
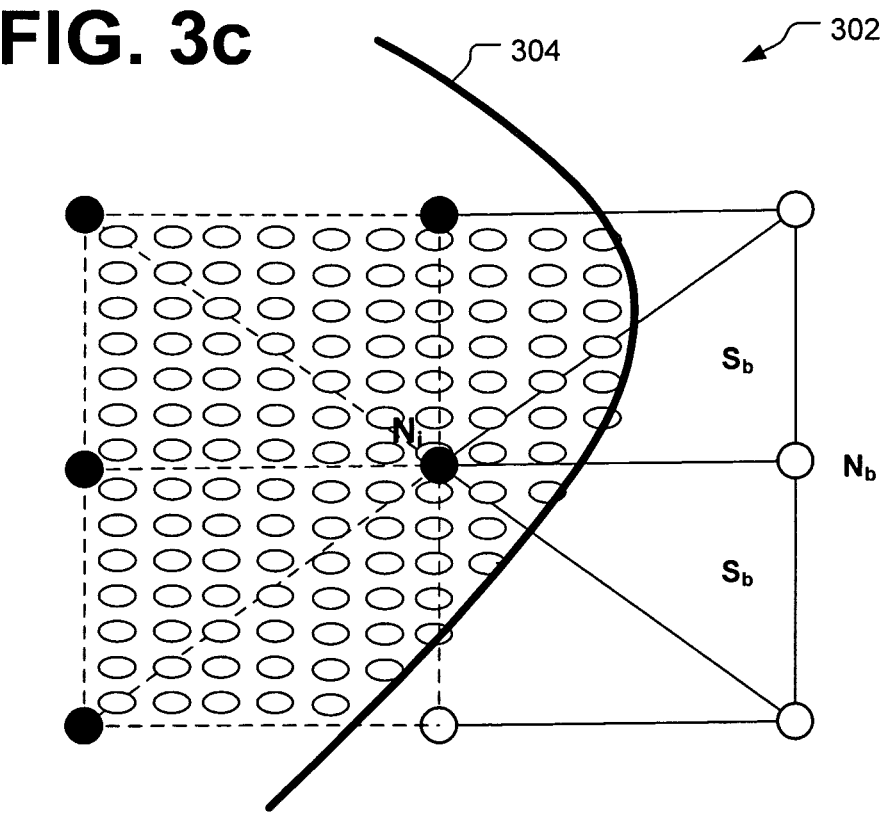

Additional reference is made to FIG. 3c, which illustrates a slice 302 of the grid structure for the inverse transfer function. The curved line 304 defines the device gamut in this 2-D slice. Node $N_i$ is an in-gamut node, and node $N_b$ is a border node.

At block 340, device-dependent values for the border nodes are extrapolated. The assigned values are out-of-gamut. The device-dependent value of each node may be extrapolated from local in-gamut values in the forward table.

At block 350, device-dependent values for the in-gamut nodes are interpolated. Border nodes are used to interpolate some of the in-gamut nodes.

Figure 4:
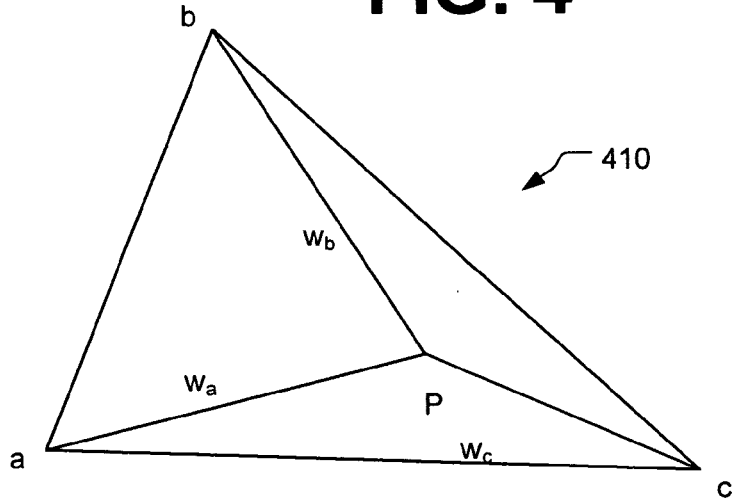
FIG. 4 is an illustration of a method of interpolating a device-dependent value for an in-gamut node of an inverse table.

FIG. 4 illustrates an example of interpolating a device-dependent value for an in-gamut node. The point P represents an in-gamut node in device-independent space. In general, the interpolation includes finding the simplex from the forward table in which the point P lies; accessing device-dependent values of the simplex vertices from the forward table; computing weights for the simplex vertices in device-independent space; and interpolating the device-dependent value at node P from the weights and vertex device-dependent values. The simplex is a tetrahedron in three-dimensions and a triangle in two dimensions. Although FIG. 4 illustrates a triangle, the same approach holds true for a tetrahedron. Applying this approach to the simplex of FIG. 4, the device-dependent values of the simplex vertices (a,b,c) are accessed from the forward table. Weights $w_a$, $w_b$, $w_c$ are computed. Using these weights, along with corresponding device-dependent values of the vertices, a device-dependent value is interpolated for in-gamut node P.

Reference is once again made to FIG. 3a. At block 360, the device-dependent values of the non-border nodes are computed by gamut mapping the non-border nodes. Such gamut mapping will be described in greater detail below.

Figure 5:
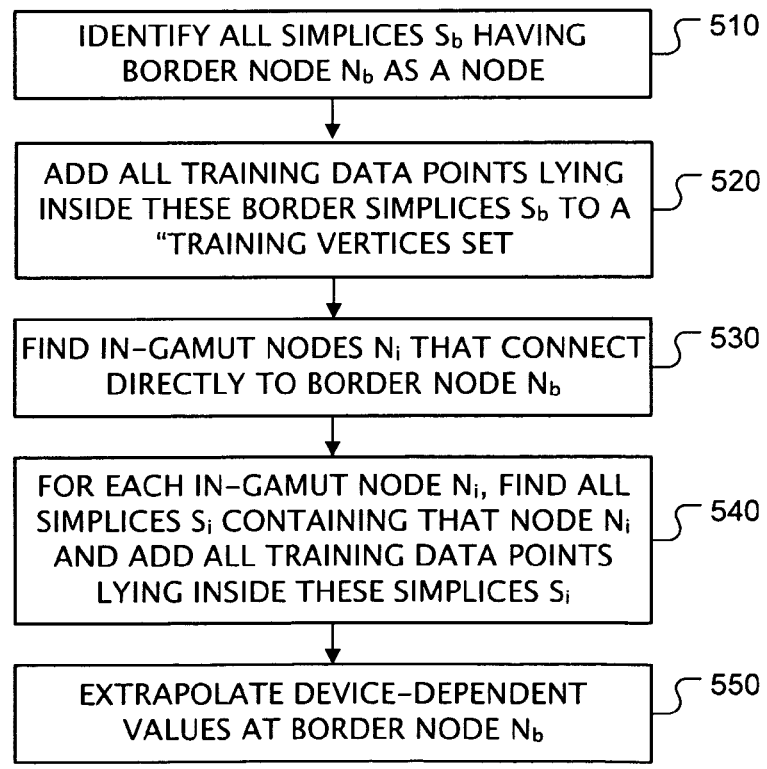
FIG. 5 is an illustration of a method of assigning a device-dependent value to a border node in accordance with an embodiment of the present invention.

Reference is now made to FIG. 5, which illustrates an exemplary method of extrapolating a device-dependent value for a border node $N_b$. In this exemplary method, in-gamut entries from the forward-table are used as "training data points." The training data points contain accurate device-dependent and device-independent values, since these values come from the forward table.

In general, a region is defined around the border node $N_b$, all training data points within that region are identified, and a device-dependent value for the border node $N_b$ is extrapolated from the device-independent value of the border node and from device-dependent and device-independent values of a subset of the training data points. The training data points in the subset lie within a region about the border node $N_b$. The subset represents the in-gamut colors influenced by the border node. An example of this method will now be provided.

At block 510, all simplices having border node $N_b$ as a node are identified. These simplices will be referred to as border simplices $S_b$. At block 520, all training data points lying inside these border simplices $S_b$ are added to a "training vertices set."

At block 530, in-gamut nodes $N_i$ that connect directly to border node $N_b$ are found to obtain an accurate region of in-gamut nodes that border node $N_b$ influences. Edges geometry may be used to find the in-gamut nodes $N_i$.

At block 540, for each in-gamut node $N_i$, all simplices $S_i$ containing that node $N_i$ are found. In-gamut training data points inside each simplex $S_i$ are found, and added to the training vertices set.

Consider the border node $N_b$ shown in FIG. 3c. Two border simplices $S_b$ for this border node are shown in solid lines. Training points contained within these two border simplices $S_b$ are illustrated by solid gray ellipses. One in-gamut node $N_i$ connects directly to border node $N_b$. Eight simplices contain this in-gamut node $N_i$ (the two border simplices $S_b$, and six simplices shown in dashed lines). Additional training data points are contained within each of these eight simplices $S_i$. These additional training data points are referred to as "extended training points" and are illustrated as solid white ellipses. Thus, the training vertices set for the border node $N_b$ consists of both training points and extended training data points.

Reference is once again made to FIG. 5. At block 550, device-dependent values at border node $N_b$ are extrapolated using the device-dependent and device-independent values for its training vertices set, as well as the device-independent value for the border node. Linear extrapolation may be performed as follows. Let m be the number of training points per border node, let Lab be the device-independent space, and let RGB be the device-dependent space. Both device-independent values ($Lab_{tr}$) and device-dependent values ($RGB_{tr}$) for these training points are known, and can be expressed as $$\begin{bmatrix} L_1 & L_2 & L_3 & \ldots & L_m \\ a_1 & a_2 & a_3 & \ldots & a_m \\ b_1 & b_2 & b_3 & \ldots & b_m \end{bmatrix} = Lab_{tr}$$

$$\begin{bmatrix} R_1 & R_2 & R_3 & \ldots & R_m \\ G_1 & G_2 & G_3 & \ldots & G_m \\ B_1 & B_2 & B_3 & \ldots & B_m \end{bmatrix} = RGB_{tr}$$

An extrapolated device-dependent value ($RGB_p$) of the border node p may be computed as $$RGB_p = RGB_{tr} * pinv(Lab_{tr}) * Lab_p$$

where $Lab_p = [L_p \ a_p \ b_p]^T$ is the device-independent value at border node p, and pinv(x) is the pseudo-inverse of x.

The method of blocks 510-550 may be performed on each border node $N_b$ in the inverse table.

The device-dependent values for the border nodes could be determined (at block 550) in ways other than linear extrapolation. For example, the device-independent values for border nodes could be determined by weighted linear extrapolation, polynomial extrapolation, neural network extrapolation, genetic programming, etc.

Figure 6:
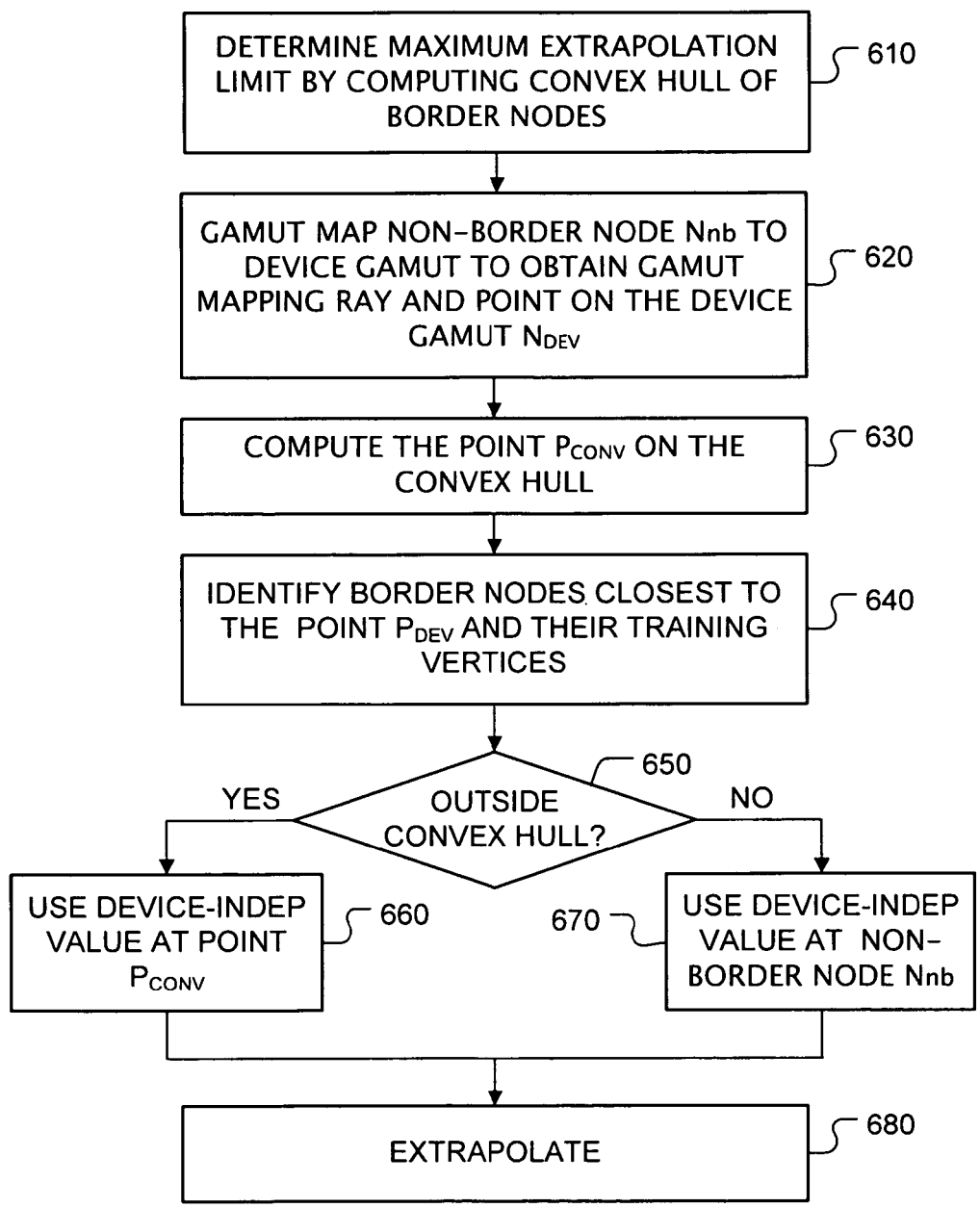
FIGS. 6-7 are illustrations of a method of extrapolating non-border node values in accordance with an embodiment of the present invention.
Figure 7:
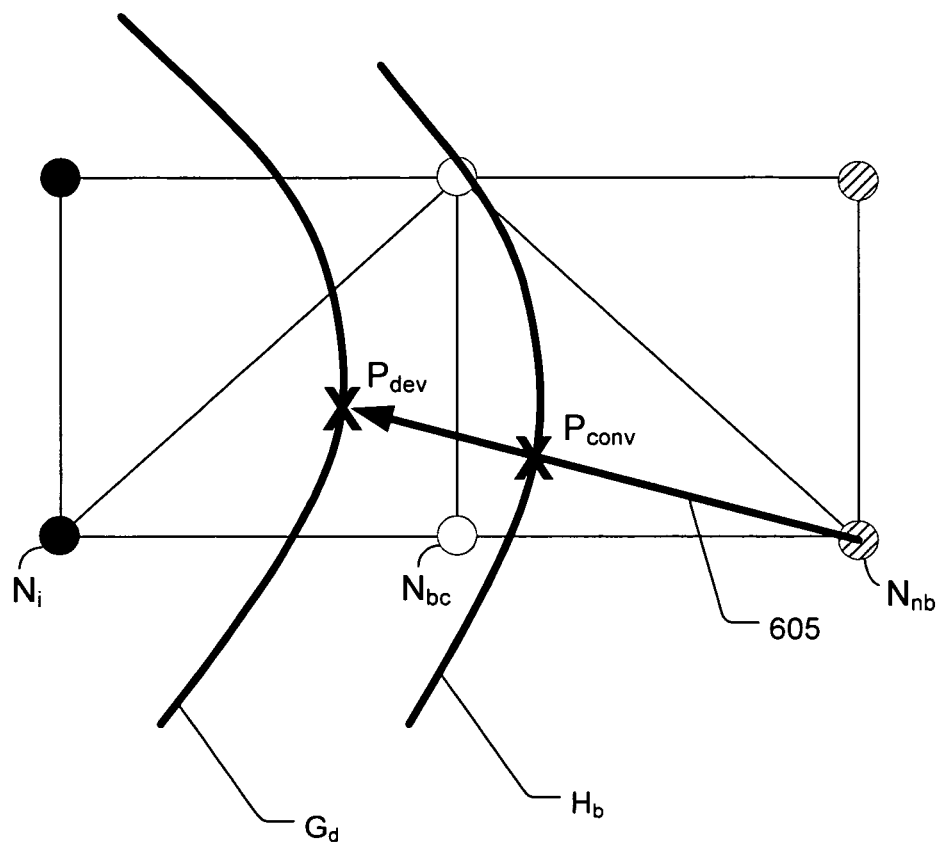

Reference is now made to FIGS. 6 and 7, which illustrate an exemplary method of assigning device-dependent values to non-border nodes $N_{nb}$. During this method, the extrapolated device-dependent values of the border nodes are not adjusted. Only the non-border nodes are gamut mapped in a way consistent with the extrapolation to prevent artifacts from appearing. The method of FIGS. 6-7 may be performed on each non-border node $N_{nb}$.

At block 610, a maximum limit of extrapolation is defined. For example, a convex hull $H_b$ of all of the border nodes $N_b$ is computed in device-independent space. Most of the non-border nodes are likely to be located outside of the convex hull $H_b$. The remaining non-border nodes will be located inside the convex hull $H_b$.

At block 620, the non-border node $N_{nb}$ is gamut mapped to the device gamut $G_d$. A conventional gamut mapping algorithm may be used. The non-border node $N_{nb}$ is gamut mapped to the device gamut $G_d$ at point $P_{dev}$ in device-independent space.

The gamut mapping produces a gamut mapping ray 605. As illustrated in FIG. 7, the gamut mapping ray 605 extends from the non-border node $N_{nb}$ to the point $P_{dev}$.

At block 630, the point $P_{conv}$ is determined in device-independent space. This point $P_{conv}$ occurs at the intersection of the gamut mapping ray 605 and the convex hull $H_b$ of border nodes.

At block 640, the border nodes $N_{bc}$ closest to intersection point $P_{dev}$ are identified, and the training vertices of those border nodes $N_{bc}$ are found.

At blocks 650-680, a device-independent value for the non-border node $N_{nb}$ is extrapolated. This device-independent value depends on the location of the non-border node $N_{nb}$ relative to the convex hull $H_b$. If the device-independent value of node $N_{nb}$ is outside the convex hull $H_b$ (block 650), the device-independent value at intersection point $P_{conv}$ on the convex hull $H_b$ is used for the extrapolation (block 660). If the device-independent value of node $N_{nb}$ is not outside the convex hull $H_b$ (block 650), the device-independent value at non-border node $N_{nb}$ is used for the extrapolation (block 670), since the device-dependent value is already within the limit of extrapolation (FIG. 7 shows the non-border node $N_{nb}$ outside the limit).

At block 680, a device-dependent value for the non-border node $N_{nb}$ is extrapolated. The device-dependent value may be extrapolated from the device-independent value for the non-border node $N_{nb}$, and the device-dependent and device-independent values of the training vertices of those border nodes $N_{bc}$.

Figure 8:
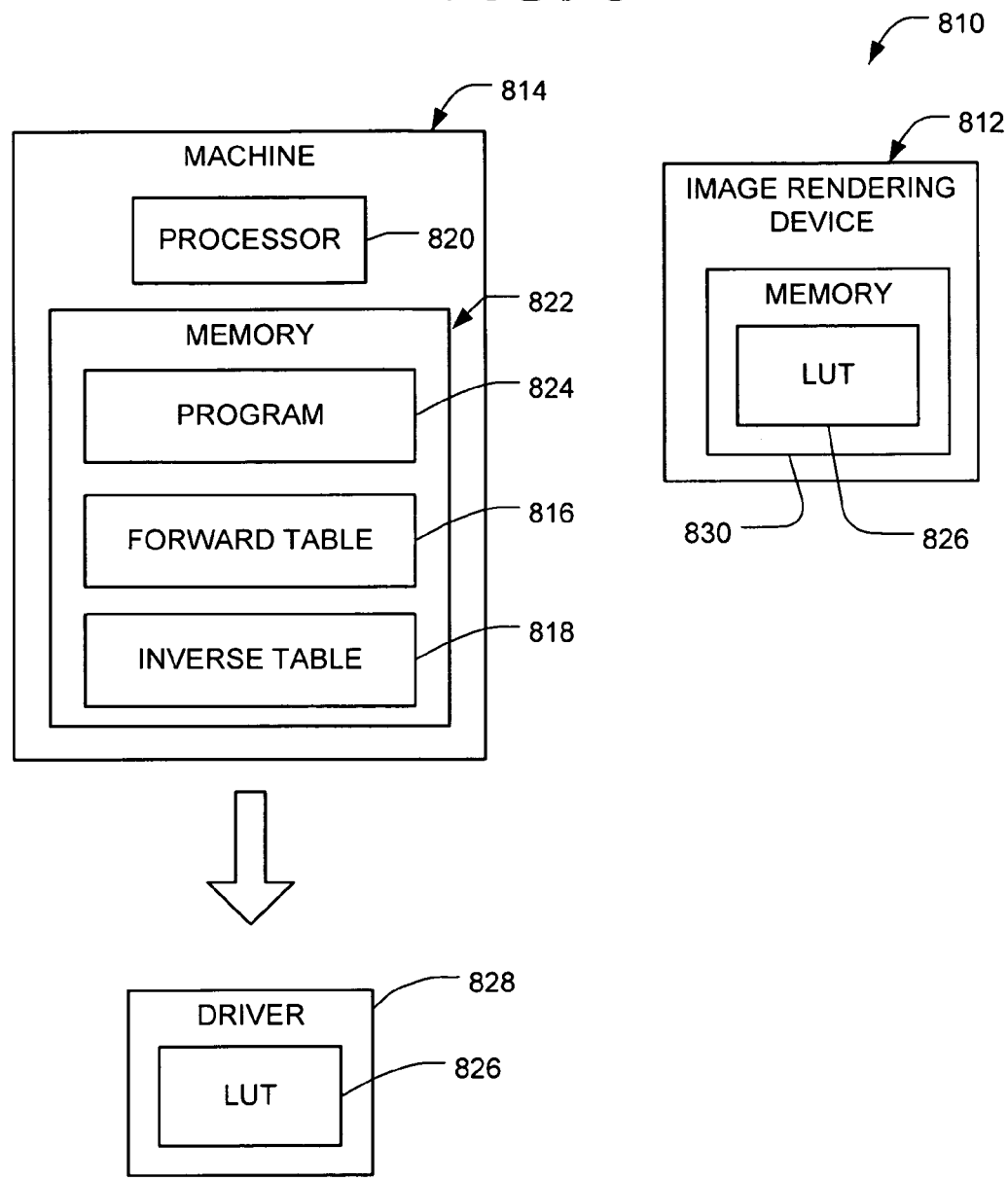
FIG. 8 is an illustration of a system in accordance with an embodiment of the present invention.

Reference is made to FIG. 8, which illustrates an exemplary system 810 for generating an inverse transfer function according to the present invention. The system 810 includes an image rendering device 812 for generating color patches, and a machine (e.g., computer) 814 for generating a forward table 816 from the color patches.

The same machine 814 (or a different machine) generates an inverse table 818 from the forward table 816. The machine 814 includes a processor 820 and memory 822. The memory 822 stores the tables 816 and 818. The memory 822 also stores a program 824 for instructing the processor 820 to generate the forward table 816 and then generate the inverse table 818.

The inverse table 818 may have the form of a look up table (LUT) 826. The LUT 826 may be distributed to a computer as part of a driver 828 for the image rendering device 812, it may be stored in memory 830 of the image rendering device 812, etc. An LUT 826 may be generated for a specific image rendering device, or for a class of image rendering devices.

A consequence of the method above is that out-of-gamut nodes will be assigned device-dependent values that are beyond the gamut of the image rendering device (e.g., less than zero or greater than 255 for an 8-bit device). The out-of-gamut values can present a problem with respect to the color tables of certain printers and ICC workflows. This problem can be overcome by encoding the device-dependent values to be within the gamut of the image rendering device.

Figure 9:
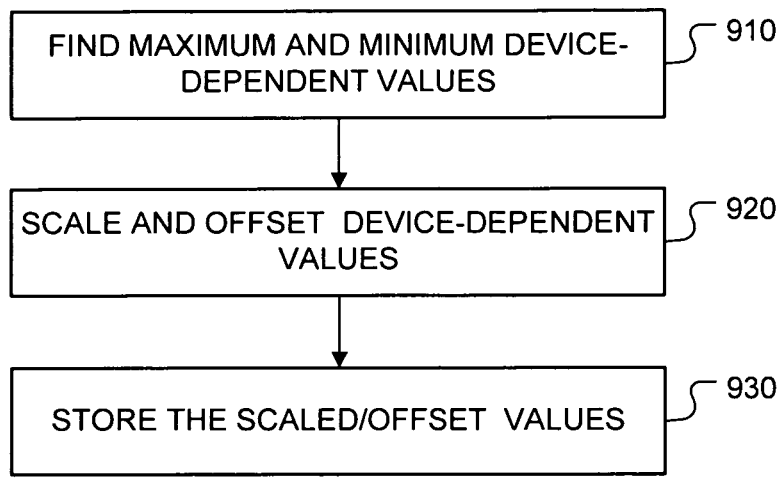
FIG. 9 is an illustration of a method for encoding device-dependent values in accordance with an embodiment of the present invention.

Reference is now made to FIG. 9, which illustrates an exemplary method of encoding the device-dependent values so they are within the gamut of the image rendering device.

Maximum and minimum device-dependent values of all the nodes are computed for each color channel (block 910). The device-dependent values are then scaled and offset using the maximum and minimum values to ensure that all values are within the normal device range (block 920). The scaled/offset values may be stored in a full three-dimensional lookup table (block 930).

Figure 10:
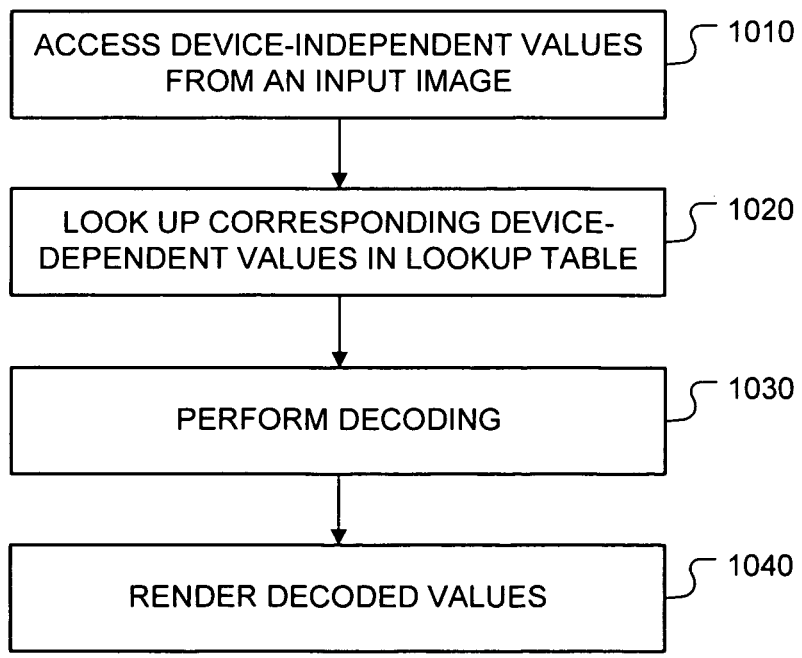
FIG. 10 is an illustration of a method in accordance with an embodiment of the present invention.

Reference is made to FIG. 10, which illustrates a method of using the device-dependent values in the lookup table. At block 1010, device-independent values from an input image are accessed. At block 1020, corresponding device-dependent values are looked up in the 3-D lookup table. Each device-independent value is used as an index to the lookup table.

At block 1030, the encoded values are decoded. The decoding removes the applied scale and offset. One-dimensional output tables may be used to perform the decoding. Architecturally, it is common for printers and ICC workflows to contain one-dimensional tables for transforming data downstream and upstream of the inverse table.

At block 1040, the decoded values are rendered.

Figure 11:
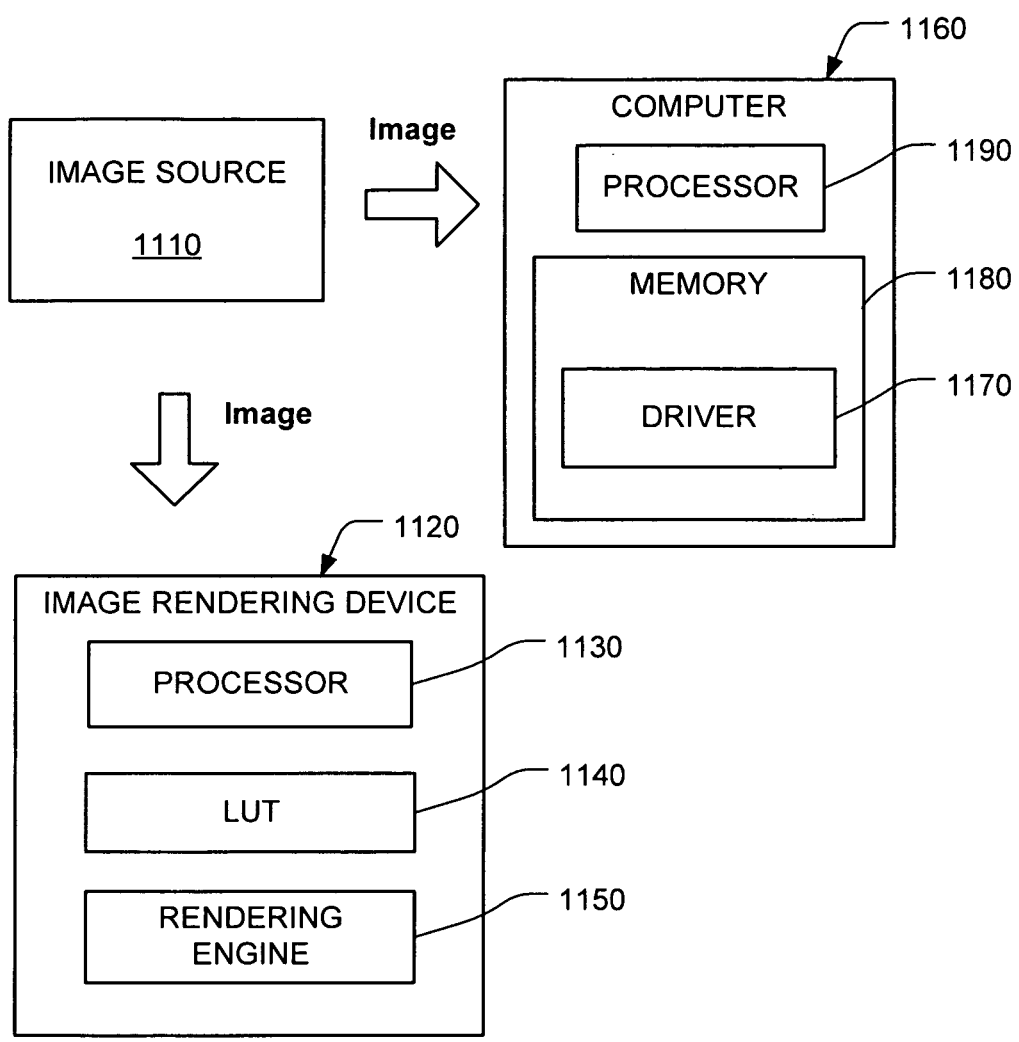
FIG. 11 is an illustration of a system in accordance with an embodiment of the present invention.

Reference is made to FIG. 11 which illustrates a system that makes use of the inverse table. An image source 1110 produces an image in a device-independent color space. For example, an image is captured with a camera or scanner and then transformed from the sensor space to a device-independent space.

The device-independent image is sent to an image rendering device 1120, which includes a processor 1130 and LUT 1140 for converting the device-independent values of the image to device-dependent values. If a device-independent value does not have a matching entry in the LUT, the processor 1130 may select the two nearest entries, and interpolate the relative amounts of primary colorants from the amounts in the two nearest entries. The device-dependent values can then be sent to an image rendering engine 1150 for rendering.

In the alternative, the lookup table could be used by a computer 1160 such as a personal computer. A driver 1170 including the lookup table may be stored in memory 1180 of the computer 1160. When executed, the driver 1170 instructs a processor 1190 of the computer 1160 to transform device-independent values of an image to device-dependent values. The computer 1160 sends the device-dependant values to the image rendering device 1120 or another image rendering device.

Although several specific embodiments of the present invention have been described and illustrated, the present invention is not limited to the specific forms or arrangements of parts so described and illustrated. Instead, the present invention is construed according to the following claims.

The invention claimed is:

1. A method executed by a computer for computing an inverse transfer function from a forward transfer function of an image rendering device, comprising:
   extrapolating device-dependent values for border nodes of the inverse transfer function, and
   computing, from the device-dependent values, values for at least some in-gamut nodes, wherein the in-gamut nodes are within a color gamut of the image rendering device, the border nodes are outside the color gamut and adjacent to the in-gamut nodes along a curve representing the color gamut, and the device-dependent values extrapolated for the border nodes are out-of-gamut.

2. The method of claim 1, wherein the border nodes are used to interpolate the in-gamut nodes.

3. The method of claim 1, wherein the forward transfer function is generated with the image rendering device, and wherein a gamut is computed for the image rendering device.

4. The method of claim 3, further comprising:
   classifying nodes of the inverse transfer function with respect to a device gamut, the classifying includes the in-gamut nodes, the border nodes, and non-border nodes; and
   wherein the device-dependent values for the border nodes and the non-border nodes are extrapolated from values in the forward transfer function.

5. The method of claim 1, wherein extrapolating a device-dependent value for a border node includes extrapolating a device-dependent value from a device-independent value of the border node and from device-dependent and device-independent values of training points, which lie within a region surrounding the border node.

6. The method of claim 5, wherein:
   all border simplices $S_b$ having border node $N_b$ as a node are identified;
   all training data points lying inside the border simplices $S_b$ are added to a training vertices set;
   in-gamut nodes $N_i$ that connect directly to border node $N_b$ are found;
   for each in-gamut node $N_i$, all simplices $S_i$ containing that node $N_i$ are found;
   training data points lying inside the simplices $S_i$ are added to the training vertices set; and
   device-dependent values at border node $N_b$ are extrapolated using the device-dependent and device-independent values for its training vertices set, as well as the device-independent value for the border node.

7. The method of claim 1, wherein the device-dependent values extrapolated for the border nodes that are out-of-gamut nodes that influence interpolation of in-gamut colors.

8. The method of claim 7, wherein a device-dependent value of non-border node is extrapolated from a device-independent value of a node, the device-independent value depending on location of the node from a maximum extrapolation limit.

9. The method of claim 8, wherein the device-independent value of the node is used for extrapolation if the node lies within a convex hull of border nodes, and wherein the device-independent value mapped to the convex hull is used for extrapolation if the node lies outside the convex hull.

10. The method of claim 1, further comprising encoding the device-dependent values to fit within a gamut of the image rendering device.

11. The method of claim 1, wherein the image rendering device is a printer, and the border nodes are out-of-gamut nodes that influence interpolation of in-gamut colors.

12. The method of claim 1, wherein the borders nodes are out-of-gamut nodes that have colors that cannot be reproduced by the image rendering device.

13. The method of claim 1, wherein the image rendering device is a printer that is programmed with the inverse transfer function.

14. An article comprising memory encoded with the inverse transfer function of claim 1.

15. An apparatus for computing an inverse transfer function for an image rendering device, comprising:
   a memory storing a program; and
   a processor that executes the program for:
      extrapolating device-dependent values for out-of-gamut nodes that influence interpolation of in-gamut nodes and that are adjacent the in-gamut nodes along a curve of a color gamut; and interpolating device-dependent values for the in-gamut nodes, wherein the in-gamut nodes are within a device gamut of the image rendering device, the out-of-gamut nodes are outside the device gamut, and the extrapolated device-dependent values are out-of-gamut.

16. The apparatus of claim 15, wherein a device-dependent value for an out-of-gamut node is extrapolated from its device-independent value and from device-dependent and device-independent values of regional in-gamut nodes, the device-dependent and device-independent values of the regional in-gamut nodes taken from a forward transfer function of the image rendering device.

17. The apparatus of claim 15, wherein the extrapolated device-dependent values are obtained from border nodes that are out-of-gamut nodes outside the curve that represents the color gamut for the image rendering device.

18. The apparatus of claim 15, wherein the processor further executes the program for extrapolating device-dependent values for the out-of-gamut nodes that do not influence the interpolation of the in-gamut nodes.

19. The apparatus of claim 18, wherein extrapolation of a non-influencing out-of gamut node is a function of a device-independent value that is subject to a maximum limit.

20. A computer, comprising:
a memory encoded with data; and
a processor that retrieves the data to:
compute an inverse transfer function from a forward transfer function of an image rendering device; and
extrapolate, from the forward transfer function, out-of-gamut device-dependent values for border nodes of the inverse transfer function, wherein the border nodes are outside a color gamut of the image rendering device and adjacent in-gamut nodes along a curve of the color gamut.

* * * * *

UNITED STATES PATENT AND TRADEMARK OFFICE
CERTIFICATE OF CORRECTION

| | | |
|---|---|---|
| PATENT NO. | : 8,705,115 B1 | Page 1 of 1 |
| APPLICATION NO. | : 11/411451 | |
| DATED | : April 22, 2014 | |
| INVENTOR(S) | : Miheer M. Bhachech et al. | |

It is certified that error appears in the above-identified patent and that said Letters Patent is hereby corrected as shown below:

In the Claims

Column 7, line 58, in Claim 1, delete "function, and" and insert -- function; and --, therefor.

Column 10, line 4, in Claim 19, delete "out-of gamut" and insert -- out-of-gamut --, therefor.

Signed and Sealed this
Twelfth Day of August, 2014

Michelle K. Lee
*Deputy Director of the United States Patent and Trademark Office*